US010188046B2

(12) United States Patent
Wik et al.

(10) Patent No.: US 10,188,046 B2
(45) Date of Patent: Jan. 29, 2019

(54) SPECTRUM OPTIMIZATION FOR ARTIFICIAL ILLUMINATION

(71) Applicant: HELIOSPECTRA AB, Gothenburg (SE)

(72) Inventors: Torsten Wik, Gothenburg (SE); Anna-Maria Carstensen, Jorlanda (SE); Teresa Pocock, Sundsvall (SE)

(73) Assignee: HELIOSPECTRA AB, Gothenburg (SE)

( * ) Notice: Subject to any disclaimer, the term of this patent is extended or adjusted under 35 U.S.C. 154(b) by 747 days.

(21) Appl. No.: 14/430,323

(22) PCT Filed: Sep. 24, 2013

(86) PCT No.: PCT/EP2013/069820
§ 371 (c)(1),
(2) Date: Mar. 23, 2015

(87) PCT Pub. No.: WO2014/044868
PCT Pub. Date: Mar. 27, 2014

(65) Prior Publication Data
US 2015/0250106 A1    Sep. 10, 2015

(30) Foreign Application Priority Data

Sep. 24, 2012   (EP) .................................. 12185721

(51) Int. Cl.
*A01G 7/00*      (2006.01)
*A01G 7/04*      (2006.01)
*H05B 33/08*     (2006.01)

(52) U.S. Cl.
CPC ......... *A01G 7/045* (2013.01); *H05B 33/0854* (2013.01); *Y02P 60/146* (2015.11)

(58) Field of Classification Search
CPC .................................. A01G 7/04; A01G 7/045
USPC ....................................................... 47/58.1 LS
See application file for complete search history.

(56) References Cited

U.S. PATENT DOCUMENTS

| | | | | |
|---|---|---|---|---|
| 2005/0281027 A1* | 12/2005 | Capen | ..................... | A01G 7/045 362/231 |
| 2008/0148630 A1* | 6/2008 | Ryan | ...................... | A01G 7/045 47/17 |
| 2008/0302004 A1* | 12/2008 | Lin | ......................... | A01G 7/045 47/58.1 LS |
| 2010/0039804 A1* | 2/2010 | Budde | .................... | A01G 7/045 362/231 |

(Continued)

FOREIGN PATENT DOCUMENTS

| | | |
|---|---|---|
| EP | 1574126 A1 | 9/2005 |
| WO | 2008078277 A1 | 7/2008 |
| WO | 2008118080 A1 | 10/2008 |

OTHER PUBLICATIONS

PCT International Search Report dated Nov. 25, 2013 for PCT International Application No. PCT/EP2013/069820, 3 pages.

*Primary Examiner* — Monica L Williams
*Assistant Examiner* — Aaron M Rodziwicz
(74) *Attorney, Agent, or Firm* — RMCK Law Group, PLC

(57) ABSTRACT

The present invention relates to a method for artificial illumination of a plant, wherein the illumination of the plant is controlled based on the amount of light being reflected from the plant. The invention also relates to a corresponding illumination system, use of the illumination system and a computer program product.

11 Claims, 5 Drawing Sheets

(56) References Cited

U.S. PATENT DOCUMENTS

| | | | |
|---|---|---|---|
| 2011/0179706 A1 | 7/2011 | Hunt et al. | |
| 2014/0165462 A1* | 6/2014 | Shigyo | A01G 33/00 47/58.1 LS |
| 2014/0352211 A1* | 12/2014 | Liotta | A01G 7/045 47/58.1 LS |
| 2015/0089867 A1* | 4/2015 | Abbott | A01G 9/00 47/58.1 LS |
| 2015/0128489 A1* | 5/2015 | Yamada | A01G 7/045 47/58.1 LS |

* cited by examiner

SPECTRUM OPTIMIZATION FOR ARTIFICIAL ILLUMINATION

CROSS-REFERENCE TO RELATED APPLICATIONS

This application is a 371 U.S. National Stage of International Application No. PCT/2013/069820, filed Sep. 24, 2013, which claims priority to European Patent Application No. 12185721.3, filed Sep. 24, 2012. The disclosure of each of the above applications is incorporated herein by reference in their entirety.

TECHNICAL FIELD

The present invention relates to a method for optimizing a spectrum of light emitted by an illumination system in a photosynthetic environment, such as for example using an illumination system arranged in a greenhouse, a walk-in chamber or a growth cabinet. The invention also relates to a corresponding illumination system, use of the illumination system and a computer program product.

BACKGROUND OF THE INVENTION

Artificial and supplemental lighting in e.g. a greenhouse typically involves use of an illumination system for stimulating plant growth, the illumination system comprising a plurality of high power light sources. Different types of light sources, having different light spectrums and providing different effects on growth stimulation, may be included, such as light sources based on metal halide (MH) or high intensity discharge (HID) which includes high pressure sodium (HPS). Using metal halide based lighting typically promotes shorter, bushy growth; whereas high pressure sodium based lighting in comparison typically tend to produce taller and stretched plants.

Recently, much progress has been made in increasing the brightness of light emitting diodes (LEDs). As a result, LEDs have become sufficiently bright and inexpensive to serve also for artificial lighting in e.g. a greenhouse environment, additionally providing the possibility of emitting light with adjustable color (light spectrum). By mixing differently colored LEDs any number of colors can be generated. An adjustable color lighting system typically comprises a number of primary colors, for one example the three primaries red, green and blue. The color of the generated light is determined by the LEDs that are used, as well as by the mixing ratios. By using LEDs it is possible to decrease the energy consumption, a requirement that is well in line with the current environmental trend. Additionally, using LED based illumination system minimizes the amount of light source generated heat which is specifically suitable in an environment where temperature control is desirable.

An example of an LED based illumination system is disclosed in WO2008118080, comprising a light sensor communicatively coupled to a processor, where the processor implements a control algorithm for modulating and improving plant growth and attributes by adjusting the light emitted by the LEDs.

WO2008118080 shows a promising approach in relation to artificial lighting in a greenhouse environment, however, it would still be desirable to further optimize the artificial and/or supplemental light emitted by an illumination system, to be able to improve the growth process of a plant.

SUMMARY OF THE INVENTION

According to a first aspect of the invention, the above is at least partly alleviated by a method for artificial illumination of a plant, the method comprising the steps of controlling an illumination system to illuminating the plant, the emitted light having a spectral distribution with a given photon irradiance or radiant flux, determining a spectral distribution of light reflected from the plant, the spectral distribution of the reflected light having a resulting radiant flux or photon irradiance, and adjusting the spectral distribution of the emitted light to optimize at least one of the spectral distribution of the reflected light or the resulting radiant or photon flux in regards to at least one predetermined criteria for illumination of the plant.

By means of the invention, the composition of emitted light reaching a plant is adjusted in such a way that the light reflected by the plant corresponds to at least one predetermined criteria for illumination of that specific plant. The optimization of the emitted light is typically (but not necessarily) made for a given radiant or photon flux, i.e. a predetermined but typically fixed total amount of light, emitted towards the plant.

The invention is based on the understanding that emitted light reaching the plant may be subdivided into different portions, including at least light being absorbed by the plant for stimulating its growth, light transmitted through the plant down towards the soil, and light reflected by the plant. The invention makes use of the light reflected by the plant as an indication for the plants growth, typically by making an estimation of the amount of light being absorbed by the plant.

Accordingly, advantages with the present invention include the possibility of adaptively adjusting the artificial illumination of the plant, taking into account current condition of the plant. Specifically, by means of the invention it may be possible to determine accurate repeatable growth results since it allow accurate repetition of the lighting conditions sensed by the plant by controlling the illumination of the plant to result in equal levels of the marginal reflectance compared to previous growths, this in arbitrary installations in different greenhouses or walk-in chambers or growth cabinets, taking into account an observed condition of the plant, use and taking into account other light sources such as natural daylight, as well as taking into account degradation or changes in the properties of the lighting system. Additionally, it may according to the invention be possible to also control the plants in relation to accurately accelerate and de-accelerate the growth by keeping record of growth rates per plant type and growth phase for different levels of radiant flux sensed by the plant and which is accurately recorded by the specific marginal reflectance for the level of radiant flux, this in respect of arbitrary installations in different greenhouses or walk-in chambers or growth cabinets. Such possibilities allows e.g. for stress reduction of the plant or growth of plants that produce a specific growth result on a specific delivery date providing a method for just-in-time production of plants.

As an example of optimization of the emitted light based on the amount of reflected light, it may be possible to adjust the spectral distribution of the emitted light, at the given radiant or photon flux, to decrease the resulting radiant flux. According to this embodiment, the composition of light emitted towards the plant is adjusted with the purpose of decreasing the amount of light being reflected from the plant(s). Based on the above discussion, i.e. in relation to the dependence between light emitted towards the plant and light being reflected, absorbed and transmitted through the plant, it is according to the invention assumed that a decreasing amount of reflected light, for a given radiant flux of the emitted light, is the result of more light being absorbed by the plant. Thus by applying a light condition that decreases the reflected light, more light is potentially "used" by the plant for stimulating its growth.

Furthermore, it should be noted that the expression "illuminating the plant" should be interpreted broadly, including direct and/or indirect (e.g. using adjacent objects such as a wall, roof or floor).

According to another embodiment, the optimization of the emitted light is achieved not only by reducing the amount of reflected light, but rather by minimizing the resulting radiant flux, for the given radiant flux of the emitted light. Thus, taking into account the above discussion, the amount of light absorbed by the plant is essentially maximized.

In a further embodiment, the optimization of the emitted light may alternatively be made by adjusting the spectral distribution of the emitted light, at the given radiant flux, such that the spectral distribution of the reflected light match a predetermined spectral distribution profile for the plant. The predetermined spectral distribution profile may correspond to a "growth regime" for the plant, where the growth regime may be developed based on, for example, different growth strategies for the plant, as well as for different growth phases and/or conditions of the plant (at different points in time).

Preferably, the given radiant flux of the emitted light is dependent on (adjusted by taking into account) at least one of the type of plant, the growth rate and growth phases of the plant, the ambient temperature, humidity, ambient light condition in the vicinity of the plant, moisture, nutrition, etc. The adjusted spectral distribution is advantageously used for controlling the light emitted by the illumination system.

It should be noted that the inventive concept, in relation to the disclosed lighting system, is suitable in an arbitrary installation as the invention focus on identifying the amount of reflected light, thus allowing compensation for the case when the plants grow closer to the light source(s).

According to a second aspect of the present invention there is provided use of an artificial illumination of a plant, the illumination system comprising a first and a second light source and at least one sensor configured to receive light reflected from the plant, wherein each of the first and the second light source is configured to emit light within a first and a second predetermined wavelength range, respectively, the use of the illumination system comprising controlling the first and the second light source to illuminate the plant with a first and a second predetermined base level radiant flux, respectively, introducing a minor variation to at least one of the first and the second base level radiant flux, determine, by means of the at least one sensor, a first level of reflected light at the first wavelength range and a second level of reflected light at the second wavelength range, determining a marginal reflectance based on the first and the second levels of reflected light from the plant at the first and second wavelengths ranges, and adjusting the radiant flux of light emitted by the first light source such that the total marginal reflectance within the first wavelength range stands in a predetermined relation to the total marginal reflectance within the second wavelength range.

In relation to the present invention, the expression "marginal reflectance" is defined as the derivates of the measured reflected light intensities with respect to the light emitted by the light sources.

By means of this aspect of the invention, it may be possible to even more accurately determine the relation between the light emitted by the illumination system and the light reflected by the plant. The inventive method allows for an optimization of the light spectrum for a general plant and general growth phase. By redefining the marginal reflectance to be the ratio between the induced light variations relative to the applied power variations, it may be possible to optimize the light emitted by the illumination system with respect to the electrical power consumption of the illumination system.

Preferably, to determine the relation between the light emitted by the illumination system and the light reflected by the plant, the minor variations are introduced to the first as well as to the second base level radiant flux. However, alternatively and within the scope of the invention, the minor variation may be introduced in regards to only one of the first as well and the second base level radiant flux.

In a preferred embodiment, the total marginal reflectance within the first wavelength range is equal to the total marginal reflectance within the second wavelength range. However, depending on the optimization scheme selected, the total marginal reflectance of the first lighting wavelength may be adjusted to correlate to the total marginal reflectance of the second lighting wavelength based on a predetermined scaling matrix. In relation to the above discussion, the scaling matrix may correspond to a specific growth regime for the plant and depend on at least one of the type of plant, the growth condition for the plant, the growth phase for the plant or the physiological state of the plant.

In a possible embodiment, the method further comprise the step of controlling the radiant flux of light emitted by the first and the second light source such that the total marginal reflectance within the first wavelength range corresponds to the total marginal reflectance within the second wavelength range.

It should be noted that the marginal reflectance could be measured from all average, specific distribution, hot spots, low spots, from a part of, or from a number of chosen leafs, canopy average of the plant. The measurement method could be varied over time and growth phase. Effects of soil could be excluded using a camera in combination with signal/image processing, e.g. focusing on compensating for area(s) not covered by the plant(s).

According to a third aspect of the present invention, there is provided an illumination system for artificial illumination of a plant, the illumination system comprising light emitting means configured to emit light of an adjustable color, a sensor configured to receive light reflected from the plant, and a control unit, the control unit being electrically coupled to the sensor and the light emitting means, wherein the control unit is configured to control the light emitting means to illuminate the plant, the emitted light having a spectral distribution with a given radiant flux, determine, by means of the sensor and the control unit, a spectral distribution of light reflected from the plant, the spectral distribution of the reflected light having a resulting radiant flux, adjusting the spectral distribution of the emitted light to optimize at least one of the spectral distribution of the reflected light or the resulting radiant flux in regards to at least one predetermined criteria for illumination of the plant, and control the light emitting means to emit light with the adjusted illumination spectrum. This aspect of the invention provides similar advantages as discussed above in relation to the first aspect of the invention.

The light emitting means may for example be provided by means of a plurality (e.g. a first and a second) light sources emitting light having different colors (e.g. light sources having different peak wavelengths within the visible spectrum). However, the same or a similar effect may also be provided using one or a plurality of light sources in combination with filters of different colors. Other possibilities are of course possible and within the scope of the invention.

Preferably, the light sources typically comprise light emitting elements, including for example different types of light emitting diodes (LEDs). As discussed above, using LEDs generally improves the efficiency of the illumination system at the same time as improved heat management is possible.

According to a fourth aspect of the present invention, there is provided an illumination system for artificial illumination of a plant, the illumination system comprising a first and a second light source, a sensor configured to receive light reflected from the plant, and a control unit, the control unit being electrically coupled to the sensor and the first and the second light source, wherein the control unit is configured to control the first and the second light source to illuminate the plant with a first and a second predetermined base level radiant flux, respectively, introduce a minor variation to at least one of the first and the second base level radiant flux, determine, by means of the at least one sensor and the control unit, a first level of reflected light at the first wavelength range and a second level of reflected light at the second wavelength range, determine a marginal reflectance based on the first and the second levels of reflected light from the plant at the first and second wavelengths ranges, and adjust the radiant flux of light emitted by the first light source such that the total marginal reflectance within the first wavelength range stands in a predetermined relation to the total marginal reflectance within the second wavelength range. This aspect of the invention provides similar advantages as discussed above in relation to the second aspect of the invention.

According to a fifth aspect of the present invention, there is provided a computer program product comprising a computer readable medium having stored thereon computer program means for controlling an illumination system configured for artificial illumination of a plant, wherein the computer program product comprises code for controlling an illumination system to illuminate the plant, the emitted light having a spectral distribution with a given radiant flux, code for determining a spectral distribution of light reflected from the plant, the spectral distribution of the reflected light having a resulting radiant flux, and code for adjusting the spectral distribution of the emitted light to optimize at least one of the spectral distribution of the reflected light or the resulting radiant flux in regards to at least one predetermined criteria for illumination of the plant. This aspect of the invention provides similar advantages as discussed above in relation to the first and the third aspect of the invention.

The control unit is preferably a micro processor or any other type of computing device. Similarly, the computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

According to a sixth aspect of the present invention, there is provided a computer program product comprising a computer readable medium having stored thereon computer program means for controlling an illumination system configured for artificial illumination of a plant, the illumination system comprising a first and a second light source, and at least one sensor configured to receive light reflected from the plant, wherein the each of the first and the second light source, is configured to emit light within a first and a second predetermined wavelength range, respectively, wherein the computer program product comprises code for controlling the first and the second light source, to illuminate the plant with a first and a second predetermined base level radiant flux, respectively, code for introducing a minor variation to at least one of the first and the second base level radiant flux, code for determining, by means of the at least one sensor, a first level of reflected light at the first wavelength range and a second level of reflected light at the second wavelength range, code for determining a marginal reflectance based on the first and the second levels of reflected light from the plant at the first and second wavelengths ranges, and code for adjusting the radiant flux of light emitted by the first light source such that the total marginal reflectance within the first wavelength range stands in a predetermined relation to the total marginal reflectance within the second wavelength range. This aspect of the invention provides similar advantages as discussed above in relation to the second and the fourth aspect of the invention.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
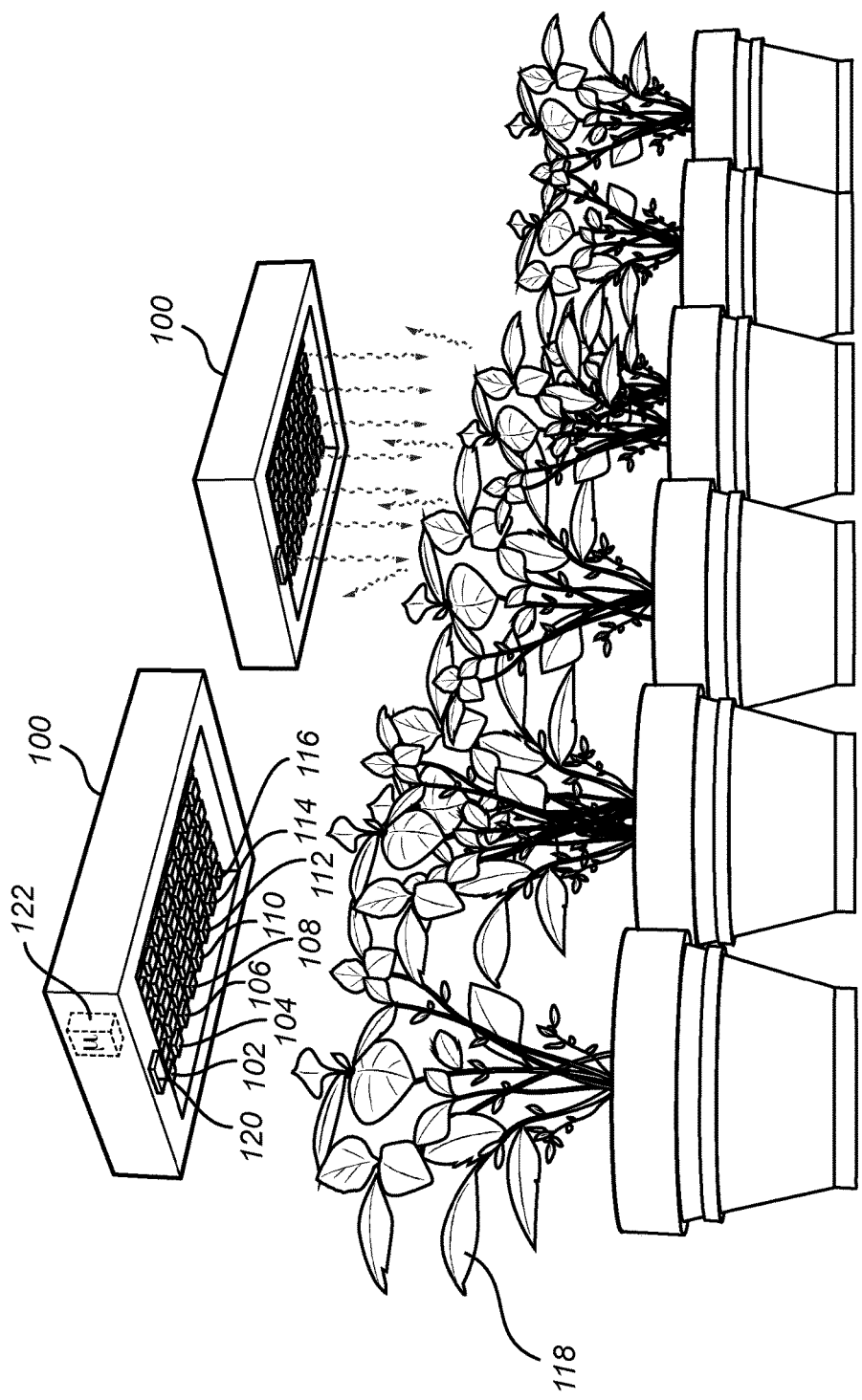
FIG. 1 shows an illumination system according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted an illumination system 100 according to a possible embodiment of the invention. The illumination system 100 comprises at least one light source. In the illustrated embodiment eight differently colored LED based light sources 102, 104, 106, 108, 110, 112, 114, 116 are provided for illuminating a plant 118. The illumination system 100 further comprises a sensor 120 configured to receive light reflected by the plant and a control unit 122, where the control unit 122 is electrically coupled to the sensor 120 as well as to the light sources 102-116.

Preferably, the light sources have different colors (spectra) and typically overlapping spectral distribution (i.e. wavelength ranges overlapping each other and having different peak wavelengths). The different colors of the light sources 102-116 typically range from ultraviolet to far-red. Even though eight light sources 102-116 are illustrated in FIG. 1, more as well as less light sources may be provided within the scope of the invention. Similarly, more light sources of the same color may be provided to achieve desirable power in a specific wavelength range. The sensor 120 selected for receiving the reflected light may for example be a spectrometer, a wavelength adjusted photoresistors (e.g. provided with a color filter), photodiodes, a CCD sensor, or any other type of sensor for receiving the reflected light. As in regards to the light sources, there may be provided a single or a plurality of sensors 120. As such, there may for example be provided one sensor for each of the light sources 102-116, each of the sensors having a wavelength response corresponding to the wavelength range of the light source.

The control unit 122 may be analogue or time discrete, include a general purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein. A similar functionality as is provided by means of the digital control unit may of course be achieved using analogue and/or a combination of electronic circuitry.

The plant 118 may be any type of plant suitable for growth stimulated by an illumination system 100 configured for providing artificial illumination. The type of plant may include herbs, medicinal plants, ornamental and general crops, etc.

Figure 2:
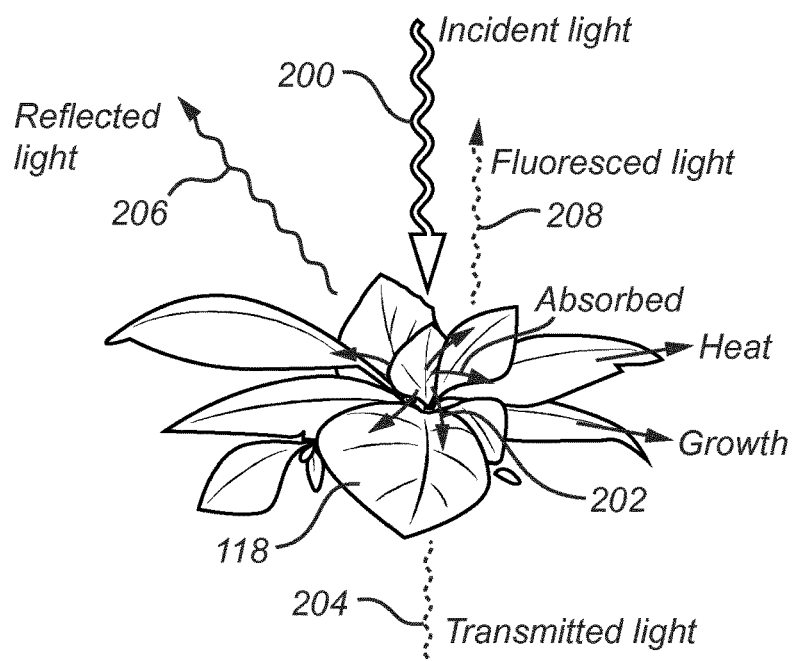
FIG. 2 illustrates the relationship between light provided by an illumination system and its subdivision into different portions when emitted towards a plant.

With further reference to FIG. 2, there is provided an illustration of the relationship between light provided by an illumination system and its subdivision into different portions when emitted 200 towards the plant 118. As discussed above, light emitted by the illumination system 100 towards the plant 118 may typically be subdivided into different portions, including at least light being absorbed 202 by the plant 118 for stimulating its growth or performance, light transmitted through 204 the plant 118 down towards the soil, and light reflected 206 by the plant 116. As may be seen from FIG. 2, a further component relating to fluoresced light 208 generated by the plant 118 is additionally provided. However, the amount of fluoresced light 208 is typically in the range of a few percent (of the total amount of light) and may either be neglected, or compensated for. The light absorbed 202 by the plant 116 may be further subdivided into stimulation for growth and heating of the plant and its ambience.

Figure 3A:
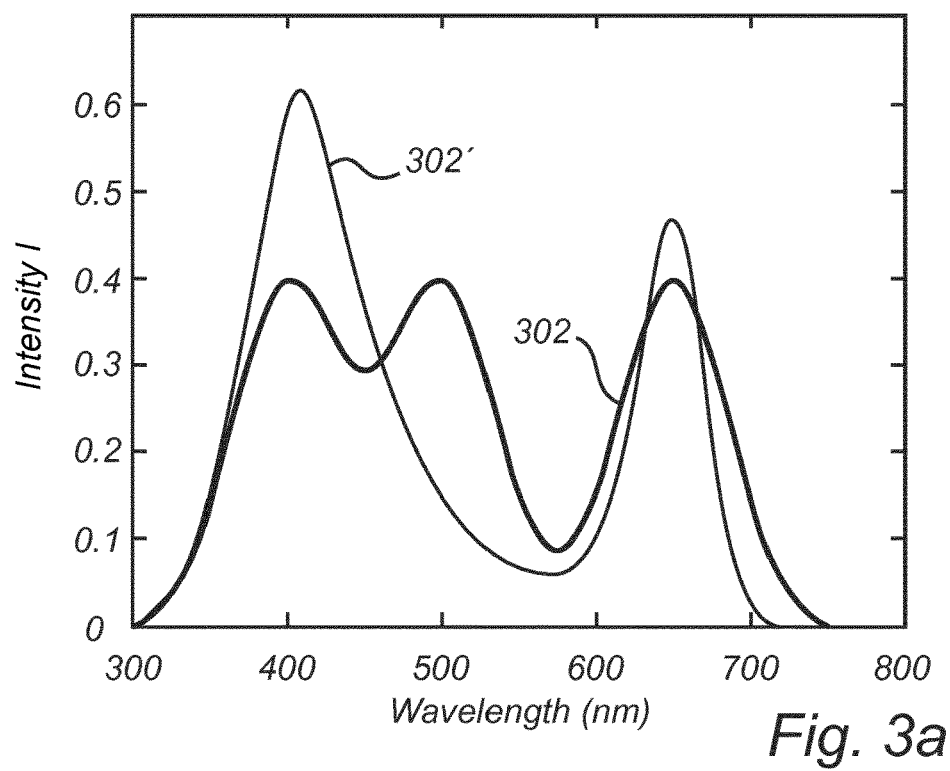
FIGS. 3a and 3b illustrates exemplary light spectrums for illumination towards and reflection from the plant.
Figure 3B:
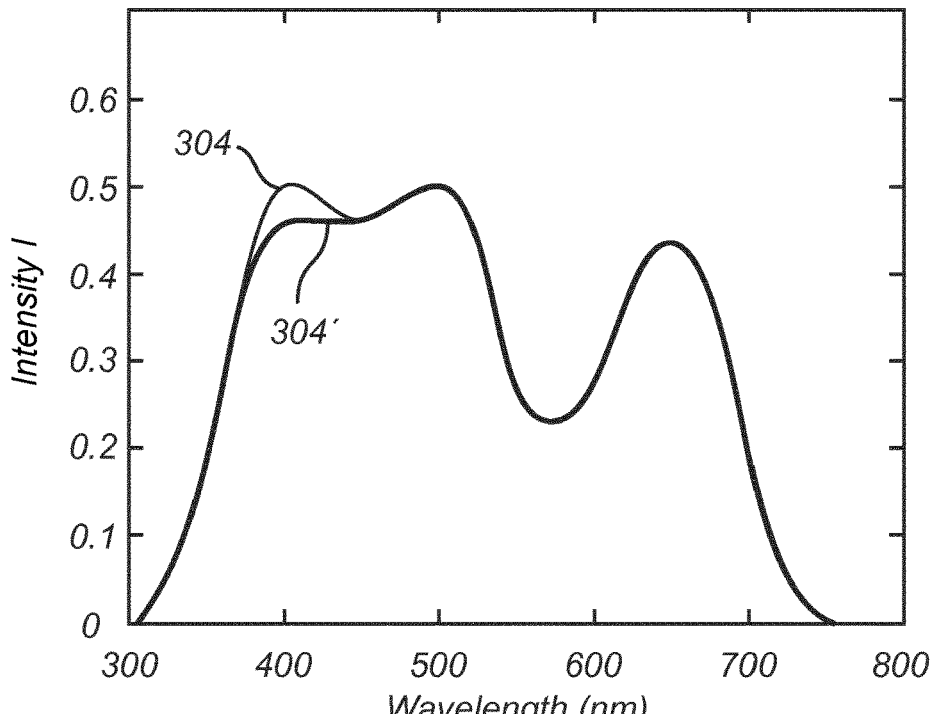
Figure 4:
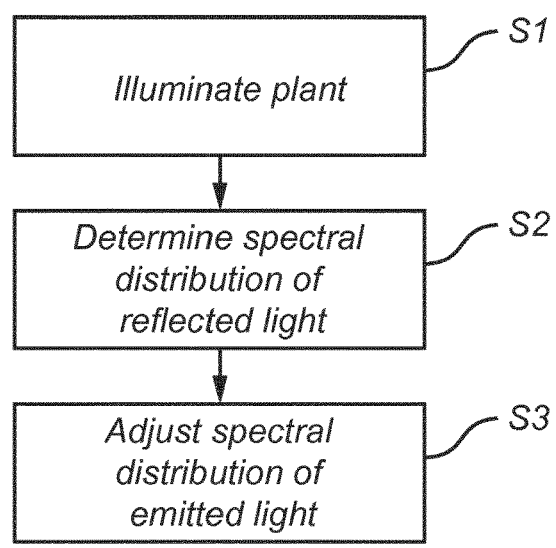
FIG. 4 provides a flow chart of the method steps according to an embodiment of the invention.

During operation of the illumination system, with further reference to FIGS. 3a, 3b and 4, the light sources 102-116 of the illumination system 100 are controlled by the control unit 122, S1, to illuminate the plant 118, the emitted light having a spectral distribution 302 with a given radiant flux. Typically, the sensor 120 receives light reflected from the plant 116 and determines, S2, in conjunction with the control unit 120, a spectral distribution 304 of light reflected from the plant 116, the spectral distribution 304 of the reflected light having a resulting radiant flux. Following the determination of the spectral distribution 304 of the reflected light, the spectral distribution 302' of the light emitted by the illumination system 100 is adjusted, S3, to optimize at least one of the spectral distribution 304 of the reflected light or the resulting radiant flux in regards to at least one predetermined criteria for illumination of the plant.

As discussed above, the spectral distribution 302 of the emitted light, at the given radiant flux, may be adjusted 302' to decrease the resulting radiant flux of the reflected light. However, the spectral distribution 302' of the emitted light, at the given radiant flux, may also be adjusted to minimize the resulting radiant flux, resulting in a different spectral distribution 304' of the reflected light.

According to a further embodiment of the invention and as discussed above, it may be possible to even more accurately determine the relation between the light emitted by the illumination system and the light reflected by the plant. The inventive method allows for an optimization of the light spectrum for a general plant, general growth phase and desired plant performance. By redefining the marginal reflectance to be the ratio between the induced light variations relative to the applied power variations, it may be possible to optimize the light emitted by the illumination system with respect to the electrical power consumption of the illumination system.

According to the invention, this may be achieved by excitations (variations) with low amplitude added to more slowly varying average levels, being larger than the amplitudes of the excitations, in the different light sources. The effect these excitations have on the registered light by the sensors is analyzed to judge the efficiency of each individual or group of light sources. Based on this, the light is adjusted through feedback such that the efficiency will be the same for all light sources, except for cases when the constraints limit the degrees of freedom. A very important consequence of the method is that the excitation and signal processing means that it may be possible to isolate the information about how the plants absorb the applied light almost irrespectively of other varying conditions, such as for example natural sunlight. Thus, it is possible to improve the energy conservation when adjusting to the arbitrary light spectrum optimal for the plant. Also, along the same line, there is possible to indicate the presence of intense arbitrary light, intense enough to stress the plants.

As discussed above, absorption of light by plants at different wavelengths depends on the light intensity. At low intensities a certain fraction (absorbance) of the light is absorbed. The absorbance depend on wavelength and in principle, this is what is commonly referred to as absorbance spectrum. When the intensities increase above a certain level there will be saturation such that the absorbance decreases with increasing intensity because the plants can simply not use the light as efficiently as at low intensities. When and how this saturation occur for a specific wavelength depends on, among other causes, the history of the plants, the type of plant 118, the temperature and intensity at all other wavelengths hitting the plants.

As an illustrative example and in relation to the below discussion, it may be assumed that only two monochromatic light sources having different wavelengths ($\lambda_1$ and $\lambda_2$) are provided in relation to the illumination system shown in FIG. 1. The power of the absorbed light $I_{A1}$ and $I_{A2}$ exhibit different saturation properties, but for simplicity we assume that the properties for $\lambda_1$ do not depend on the intensity $I_2$ for $\lambda_2$ and vice versa. In the illustrative example, it may be assumed that the wavelength $\lambda_1$ is easier absorbed than at $\lambda_2$ for low intensities and for high intensities the assumption is the opposite. Additionally, assuming that it is desirable to maximize the total absorbed power $I_{A1}+I_{A2}$ for a given fixed total applied intensity $I=I_1+I_2$, i.e. maximize $$V = I_{A1}(I_1) + I_{A2}(I_2)$$

If $I=I_1+I_2$ is used, the derivative of V is taken w.r.t. $I_1$, and the result is set to zero to find the optimum, the result will be $$\frac{dV}{dI_1} = \frac{d}{dI_1}I_{A1}(I_1) + \frac{d}{dI_1}I_{A2}(I - I_1)$$
$$= 0$$

Since $dI_2/dI_1 = -1$, the result will be given as $$\frac{dI_{A1}}{dI_1} = \frac{dI_{A2}}{dI_2} \quad (2)$$

Now, the distribution of a total applied intensity I on the two wavelengths $\lambda_1$ and $\lambda_2$ that optimizes the absorption may be determined. If it is preferred to optimize the powers $P_1$ and $P_2$ to the two light sources, the solution becomes the same, i.e. the optimal distribution requires $$\frac{dI_{A1}}{dP_1} = \frac{dI_{A2}}{dP_2} \quad (2)$$

The example above may be generalized to arbitrarily many wavelengths. Assume n wavelengths and $P_1+P_2+\ldots+P_n=P_{tot}$. Writing $$P_n = P_{tot} - \sum_{i=1}^{n-1} P_i$$

with the desire to maximize $$V = \sum_{i=1}^{n} I_{Ai}(P_i)$$
$$= \sum_{i=1}^{n-1} I_{Ai}(P_i) + I_{An}(P_{tot} - P_1 - P_2 \ldots - P_{n-1}).$$

At optimum, the derivatives of V w.r.t. all inputs $P_i$ must be zero, i.e.

$$\frac{dV}{dP_i} = \frac{dI_{Ai}}{dP_i} + \frac{dI_{An}}{dP_n}\frac{dP_n}{dP_i}$$
$$= 0,$$
$$i = 1, \ldots n-1$$

Since $dP_n/dP_i = -1$ for all i, this means that the optimal distribution requires all partial derivatives to be equal for all wavelengths. In general though the absorption curves $I_{Ai}$ for different wavelengths $\lambda_i$ are not known, this means that the conditions above in practice may not be used as they are. However, using a few simplifications it may be possible to show that these conditions may be satisfied by adjusting the light sources based on an analysis of the reflected light.

The energy flows for a plant being illuminated with an incident light of total intensity I are shown in FIG. 2. For mature plants the transmitted light $I_T$ through all of the plants down to the soil is normally low as is also the fluoresced light, which is in the order of a few percent. Since the light registered by the sensor/sensors for a certain wavelength originates from incident light at the same wavelength, it may be possible to make the simplifying assumption $$I(\lambda) \approx I_R(\lambda) + I_A(\lambda) \quad (3):$$

where $I_R$ denotes the intensity of the reflected light. Thus, maximizing the absorbed light for a given total applied intensity I, or total power P, basically corresponds to minimizing the intensity of the reflected light.

Assuming absorbance and reflectance at wavelength $\lambda_i$ only depends on the applied light $I_i \equiv I(\lambda_i)$ at that wavelength, the result will be $$V = \sum_{i=1}^{n} I_{Ai}$$
$$= \sum_{i=1}^{n} I_i - I_{Ri}$$

where $I_{Ri} \equiv I_{R(\lambda_i)}$. For a fixed total applied intensity $$I_{tot} = \sum_{i=1}^{n} I_i$$

it may be possible to proceed as before by differentiating V with respect to $I_i$ to show that the optimum distribution is achieved if $$\frac{dI_{R1}}{dI_1} = \frac{dI_{R2}}{dI_2} \quad (4)$$
$$= \ldots$$
$$= \frac{dI_{Rn}}{dI_n}.$$

Each derivative $dI_{Ri}/dI_i$ is a measure of how large part of any additional light from source i will be reflected, which means that we will refer to this as a marginal reflectance.

Now there are two remaining issues to resolve before actually being able to use the conditions of optimality. First, it is desirable to estimate the ratios, and then it may be necessary to handle situations when there is an overlap of the spectra of the different light sources. In order to do so, it may be useful to introduce a linearization of the reflectance around an operating point (applied powers).

Accordingly, assuming the actuation of a small change $\Delta I_i$, this change will cause a small change in the reflected light. Since all physical properties on this level can be assumed continuous the resulting variation becomes $$\Delta I_R(\lambda_i, t) \approx \left(\frac{d}{dI_i} I_R(\lambda_i)\right) \Delta I_i(t) \equiv K_i \Delta I_i(t)$$

By continuously superimposing small and rapid changes $\Delta I_i(t)$, i=1, n on the more slowly varying base levels $I_i$, it may be possible to estimate $K_i$ for all i. If we let the amplitudes of the variations become infinitesimal this incremental reflectance $K_i$ converges to the marginal reflectance in Equation (4). The optimality condition (see equation 4) can then be formulated as the incremental reflectance should be equal for all wavelengths.

As mentioned earlier $K_i$ will vary over time depending on the base levels of the other light sources, the natural sunlight, temperature etc. If the time scale for the variations caused by the excitation is different (faster) than the changes in base levels, it may be possible to track $K_i$ by recursive parameter estimation, for example, from the measured variations in the reflected light, $$\Delta I_{Ri} \equiv \Delta_R(\lambda_i) = I_R(\lambda_i) - LP(I_R(\lambda_i))$$

where $LP(I_R)$ denotes a low pass filtered $I_R$, such as for example a moving average.

Figure 5:
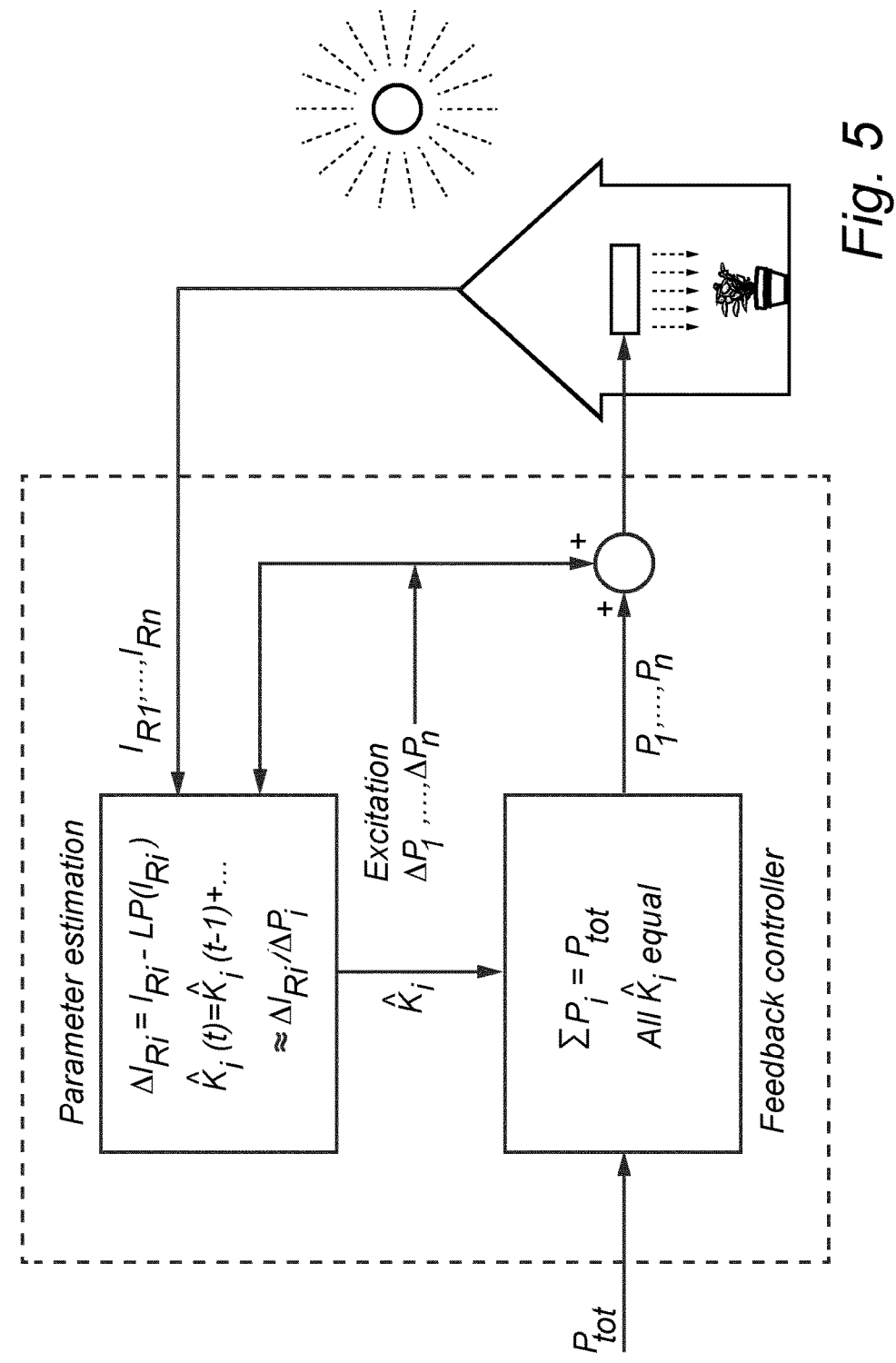
FIG. 5 shows an exemplary structure of a feedback spectrum optimizer.

Thus, let t denote time in the longer perspective where the base levels change, and consider $K_i(t)$, I=1, . . . , n, as measured outputs instead. A feedback controller such as illustrated in FIG. 5 can then be implemented to control the estimated gains $K_i(t)$ to be as close to equal for all i as possible, given a total applied intensity $P_{tot}$, hence aiming for the optimality condition (see again equation 4). For the case when the spectrums are non-overlapping between the different light sources, this feedback control may be straightforward. Comparing the estimated $K_i$ with, for example, the mean of all $K_i$ will decide whether to increase or decrease each power $P_i$. For instance, a too high $K_i$ means that reflection is stronger and absorption is weaker than optimum, and hence the controller should decrease $P_i$, and vice versa.

When light sources that are not monochromatic are used but having overlapping spectra, the solution becomes slightly more complicated. Assuming m light sources and sensor signals interpreted as light intensities at n different wavelengths. It may then also be desirable to switch from viewing the applied intensities as known inputs to defining the inputs as the actual powers $P_i$ supplied to the light sources.

Instead of estimating the incremental reflectance we will therefore use a linearization with respect to the inputs $P_i$. Based on an assumption of continuity, small changes in the powers $\Delta P_i$ will cause $$\begin{bmatrix} \Delta I_{R1} \\ \Delta I_{R2} \\ \vdots \\ \Delta I_{Rn} \end{bmatrix} \approx \begin{bmatrix} K_{11} & K_{12} & \ldots & K_{1m} \\ K_{21} & K_{22} & \ldots & K_{2m} \\ \vdots & & \vdots & \\ K_{n1} & K_{n2} & \ldots & K_{nm} \end{bmatrix} \begin{bmatrix} \Delta P_1 \\ \Delta P_2 \\ \vdots \\ \Delta P_m \end{bmatrix} \quad (5)$$

i.e. $\Delta I_R(t) \approx K \Delta P(t)$, where $$\Delta I_R(t) = [\Delta I_{R1}(t) \; \Delta I_{R2}(t) \; \ldots \; \Delta I_{Rn}(t)]^T$$
$$= I_R(t) - \bar{I}_R$$
$$\Delta P(t) = [\Delta P_1(t) \; \Delta P_2(t) \; \ldots \; \Delta P_m(t)]^T$$
$$= P(t) - \bar{P}$$

and $\bar{I}_R$ is the stationary reflected intensity corresponding to a constant applied power $\bar{P}$.

Let the relation between the applied powers and the intensities be $$\Delta I(t) = I(t) - \bar{I}$$
$$= \begin{bmatrix} \phi_{11} & \ldots & \phi_{1m} \\ \vdots & \ddots & \vdots \\ \phi_{n1} & \ldots & \phi_{nm} \end{bmatrix} \Delta P(t)$$
$$= \Phi \Delta P(t)$$

where $\bar{I}$ is the intensities corresponding to $\bar{P}$.

Now, it is desirable to maximize the absorbed light for a given total power, i.e.

$$\max_{\sum \Delta P_j = 0} V(\Delta P)$$

where $$V = \sum_{i=1}^{n} I_i - I_{Ri}$$
$$= \sum_{i=1}^{n} \left( \bar{I}_i + \sum_{j=1}^{m} \phi_{ij} \Delta P_j - \bar{I}_{Ri} - \sum_{j=1}^{m} K_{ij} \Delta P_j \right)$$

The optimization problem then have m−1 degrees of freedom since one degree is lost by the condition that the sum of all changes in power $\Delta P_i$ should be zero. If, for example, $$\Delta P_m = -\sum_{j=1}^{m-1} \Delta P_j$$

is substituted into V, we get $$V = \sum_{i=1}^{n} I_i - I_{Ri}$$
$$= \sum_{i=1}^{n} \left( \begin{array}{l} \bar{I}_i - \bar{I}_{Ri} + \sum_{j=1}^{m-1} (\phi_{ij} - K_{ij}) \Delta P_j + \\ (\phi_{im} - K_{im})(-\Delta P_1 - \ldots - \Delta P_{m-1}) \end{array} \right)$$

Differentiating gives $$\frac{\partial V}{\partial \Delta P_j} = \sum_{i=1}^{n} (\phi_{ij} - \phi_{im}) - (K_{ij} - K_{im}), \forall j$$

In the optimum $\nabla V(\Delta P)=0$, which gives $$\sum_{i=1}^{n} K_{ij} - \sum_{i=1}^{n} (\phi_{ij} - \phi_{im}) = \sum_{i=1}^{n} K_{im}, \forall j \quad (6)$$

Hence, for all j (light sources)

$$y_j = \sum_{i=1}^{n} K_{ij} - \kappa_j$$

where $K_j \kappa K_j = \sum_{i=0}^{n}(\varnothing_{ij} - \bullet_m) \sum_{i=0}^{n}(\phi_{ij}\varnothing_{ij} - \phi_{im}\bullet_m)$ is a constant, should be equal.

Since $\sum_{i=0}^{n}\varnothing_{ij}\sum_{i=0}^{n}\phi_{ij}\varnothing_{ij}$ is the actual efficiency from $P_j$ to all the intensities $I_j$, $\kappa_j$ can be seen as compensation for the possibly different efficiencies of the light sources. If they all have the same total efficiency the optimality condition (see equation 6) states that the sum of all the elements in each column of K should be equal for the power distribution to be optimal. The physical interpretation of this is quite straight forward, accordingly it is desired that the total efficiency for all measured wavelengths from each power to be equal. It may be noted that the previously illustrated case with non-overlapping spectra and as many sensor signals as there are light sources, which results in a diagonal K-matrix, is a special case. The condition of optimality then reduces to all diagonal elements $K_{ii}$ being equal.

The determination of K can be performed in many different ways depending on the situation, whether K is assumed constant or time varying, and whether K is estimated on-line in real time or off-line. Off-line estimation for the case when K is constant is readily carried out using least squares. For example, if we want to determine K in Equation (5) after collecting N samples of the applied powers and reflected light we can solve $$\hat{K} = \underset{K}{\mathrm{argmin}} \sum_{t=1}^{N} \|\Delta I_R(t) - K\Delta P(t)\|^2$$

To fully exploit the use of the present innovation including feedback control, however, we are mainly interested in online estimation of a varying K. One way is to use recursive least squares (RLS) with a forgetting factor $\lambda$, i.e. solving $$\hat{K}(t) = \underset{K}{\mathrm{argmin}} \frac{1}{2}\sum_{\tau=1}^{t} \lambda^{t-\tau}\|\Delta I_R(\tau) - K\Delta P(\tau)\|^2$$

which has a solution that results in a numerically efficient recursive algorithm. However, there are numerous other alternatives, such as Kalman filters, various adaptive filters, a BLU estimator, prediction error methods etc. that may be more efficient, depending on measurement and process noise character and unmodelled phenomena. Important for the methods is that the excitation signal $\Delta P$ or $\Delta I$ is sufficiently exciting. By applying a random input though problems of poor excitation can be avoided.

A different way of estimating K is to apply different frequencies for each individual light source. That way the contribution from each source to each output can be determined by band pass filtering of the output measurements. Such a treatment, as well as amplitude modulation/demodulation techniques can be performed without any computing capacity, hence feasible to implement using analogue and/or a combination of electronic circuitry. The feedback controller to drive the illumination system towards equal efficiency can be made in different ways. One way is to go directly for the sum of each column of K (compensated for $\kappa_j$), which corresponds to a measure of the wasted power (inefficiency) from each light source. The illumination system to be controlled may then be seen as a square MIMO system with n inputs (the powers $P_i$ applied to each light source) and n outputs $y_i = \Sigma_j K_{ij}$ (the inefficiency of each light source). A MIMO controller may then be used to control the power distribution to minimize the inefficiencies by equalizing them.

In many cases, $y_j$ may be expected to mainly depend on $P_j$, and then it may be possible to use n SISO controllers to adjust the proportions of the power relative to the total power and a rapid integrating SISO controller to adjust the total power.

Figure 6:
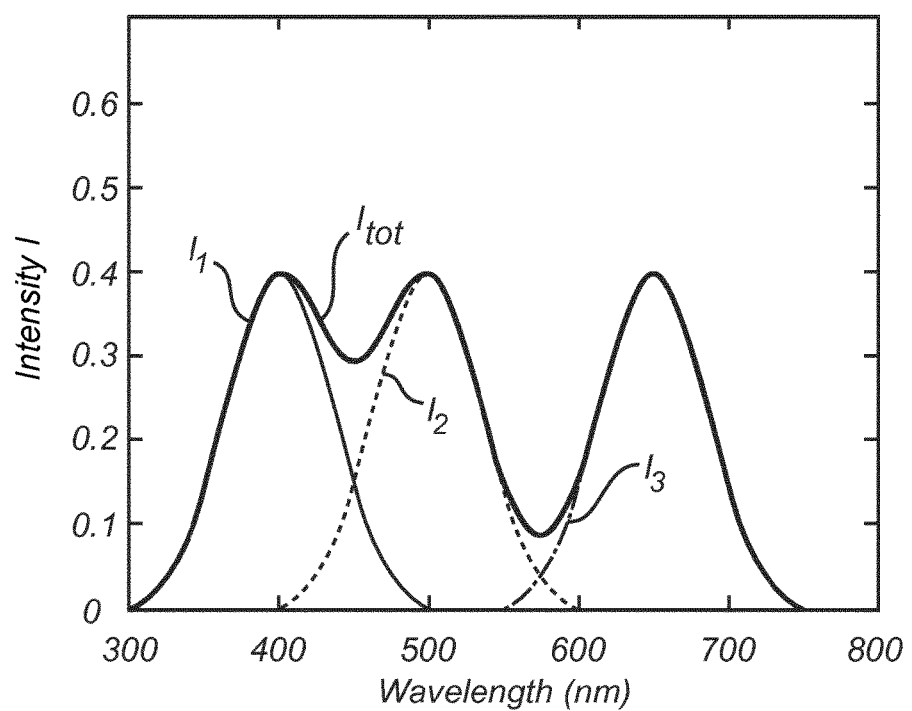
FIG. 6 provides an exemplary illustration of a plurality of light sources having overlapping spectra.

To illustrate, consider a system with three light sources (blue, green and red) with overlapping spectra, with further reference to FIG. 6, and three sensors measuring the intensity at three different wavelengths ($\lambda_i$, i=1, 2, 3). To simplify, the normalized spectra of the sources are unchanged when the powers vary. The incident intensities at the three different wavelengths are then given by $$\begin{bmatrix} I(\lambda_1) \\ I(\lambda_2) \\ I(\lambda_3) \end{bmatrix} = \underbrace{\begin{bmatrix} 0.3989 & 0.0073 & 0.0000 \\ 0.0073 & 0.3989 & 0.0000 \\ 0.0000 & 0.0000 & 0.3989 \end{bmatrix}}_{\Phi} \begin{bmatrix} P_1 \\ P_2 \\ P_3 \end{bmatrix}$$

To simplify the illustration it is assumed that the absorption at one wavelength does not depend on the applied light at the other wavelengths. For each wavelength $\lambda_i$ it is assumed that the absorbance saturation is described by $$I_A(\lambda_i) = \frac{\gamma_i I(\lambda_i)}{C_i + I(\lambda_i)}, i = 1, 2, 3 \quad (7)$$

where $\gamma_i/C_i$ is the maximum absorbance and $C_i$ is a constant that determines at what level the saturation starts to limit the absorbance. Since more light than provided may never be absorbed, it may be concluded that this model implies that for each wavelength $\gamma_i/C_i \leq 1$. In this example it is assumed that $$\gamma=[0.2\ 0.1\ 0.15] \text{ and } C=[0.2\ 0.15\ 0.2]$$

Using equation (3) it is possible to get the approximation $$I_R(\lambda_i) \approx I(\lambda_i) - I_A(\lambda_i)$$
$$= I(\lambda_i)\left(1 - \frac{\gamma_i}{C_i + I(\lambda_i)}\right)$$

which gives $$\frac{dI_R(\lambda_i)}{dI(\lambda_i)} = 1 - \frac{\gamma_i}{C_i + I(\lambda_i)} + \frac{\gamma_i I(\lambda_i)}{(C_i + I(\lambda_i))^2}$$
$$= 1 - \frac{\gamma_i C_i}{(C_i + I(\lambda_i))^2}$$

Having the analytical expressions for the reflectance, the gain K may be determined:

$$K \equiv \frac{dI_R(\lambda_i)}{dP_i} = \begin{bmatrix} 1 - \frac{\gamma_1 C_1}{(C_1 + I(\lambda_1))^2} & 0 & 0 \\ 0 & 1 - \frac{\gamma_2 C_2}{(C_2 + I(\lambda_2))^2} & 0 \\ 0 & 0 & 1 - \frac{\gamma_3 C_3}{(C_3 + I(\lambda_3))^2} \end{bmatrix} \Phi$$

In the description of the system here it has been assumed that there is a static relation between the incoming light and the reflected light. In reality this is a rapid but dynamic system with dynamics in the light sources, the plants and the sensors. A simple solution is to use piecewise constant excitation signals and sample such that the output signal used is somewhat delayed such that the transients will have time to settle. Another alternative is to actually estimate parameters in a dynamic model and then use a more complex optimization.

In the examples and equations shown it has been clarified how the amount of reflected light can be minimized for given lamp outputs or applied electrical power. The foundation was that maximized plant absorption could then be achieved, and that a maximized absorption would be optimal for the plant, which is in general not entirely true. The way it has been formulated the innovation could also be misinterpreted as if the reflected light is always measured at some specific wavelengths. These two issues are therefore further discussed and it is demonstrated how both can be handled and incorporated in the optimization in the same way.

Light can be measured in many different ways and in different units. For plants it may not be the absorbance in Watts that we want to maximize, since it is rather the actual biological benefit of the absorbed light we want to optimize. Presuming absorption is not affected by excess light it is more likely the reflected photon flux that should be minimized. Even so, photons of different wavelengths may be utilized differently and to compensate for this, weights $w_i$ can be assigned to each reflected light measure, resulting in a modified matrix K to optimize. Mathematically it makes no difference if we use the new measures $$\Delta I'_R = \underbrace{\begin{bmatrix} w_1 & 0 & \cdots & 0 \\ 0 & w_2 & & 0 \\ \vdots & & \ddots & \vdots \\ 0 & \cdots & 0 & w_n \end{bmatrix}}_{W_R} \Delta I_R$$

and optimize K from input to $\Delta I'_R$, or multiply our previous K with the scaling matrix $W_R$ and then optimize $K' = W_R K$. If we can assign a specific biological efficiency to each light source a corresponding scaling can then be made but on the input side, i.e. $K' = K W_P$, where $W_P$ is a diagonal scaling matrix with the weight elements corresponding to each light source on the diagonal.

Now, we are interested how light, not only at presumed peak wavelengths are absorbed, and the peak wavelengths of a specific light source may also wander with changing temperature, aging etc. More robust measures are therefore based on reflected light integrated over a wavelength range. This can easily be achieved numerically, but it could also be the effect of light being sensed by a sensor, such as a photodiode, having a detection spectrum of significant width. In the case of a numerical treatment the weights $w_i$ for these measures can be replaced by wavelength dependent weights included in the integration to account for how photons of different wavelengths are preferred.

For a specific type of plant it may be the case that the preferred scaling is different in different stages of the growth cycle and at different environmental conditions. The scaling may then be seen as a tuning instrument by allowing the weights to change over time.

In summary, the present invention relates to a method for artificial illumination of a plant, the method comprising the steps of controlling an illumination system to illuminate the plant, the emitted light having a spectral distribution with a given radiant flux, determining a spectral distribution of light reflected from the plant, the spectral distribution of the reflected light having a resulting radiant flux, and adjusting the spectral distribution of the emitted light to optimize at least one of the spectral distribution of the reflected light or the resulting radiant flux in regards to at least one predetermined criteria for illumination of the plant.

By means of the invention, the composition of light emitted is adjusted in such a way that the light reflected by the plant corresponds to at least one predetermined criteria for illumination of that specific plant. The optimization of the emitted light is made for a given radiant flux, i.e. a predetermined but typically fixed total amount of light, emitted towards the plant.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of using an illumination system for artificial illumination of a plant, the illumination system comprising a first and a second light source and at least one sensor configured to receive light reflected from the plant, wherein the first and the second light sources are configured to emit light within a first and a second predetermined wavelength range, respectively, the method comprising:
controlling the first and the second light source to illuminate the plant with a first and a second predetermined base level radiant flux, respectively;
introducing a minor variation to at least one of the first and the second base level radiant flux;
determining, by the at least one sensor, a first level of reflected light within the first wavelength range and a second level of reflected light at the second wavelength range;
estimating a marginal reflectance based on the first and the second levels of reflected light from the plant within each of the first and second wavelength ranges, wherein the marginal reflectance comprises a derivative of the first or the second levels of reflected light with respect to the first and the second predetermined base level radiant flux, respectively; and
adjusting a radiant flux of light emitted by the first light source such that the marginal reflectance within the first wavelength range stands in a predetermined relation to the marginal reflectance within the second wavelength range.

2. The method according to claim 1, wherein the marginal reflectance within the first wavelength range is equal to the marginal reflectance within the second wavelength range.

3. The method according to claim 2, wherein the marginal reflectance of the first lighting wavelength correlates to the marginal reflectance of the second lighting wavelength based on a predetermined scaling matrix.

4. The method according to claim 1, wherein the minor variation is introduced to the first and the second base level radiant flux.

5. The method according to claim 3, wherein the scaling matrix is dependent on at least one of a type of plant, a growth cycle of the plant, or an ambient temperature, humidity, ambient light condition in a vicinity of the plant.

6. The method according to claim 1, further comprising controlling the radiant flux of light emitted by the first and the second light source such that the marginal reflectance within the first wavelength range corresponds to the marginal reflectance within the second wavelength range.

7. The method according to claim 1, wherein said marginal reflectance is estimated by an incremental reflectance given by:

$$K_i = \frac{\Delta I_R(\lambda_i)}{\Delta I_i},$$

where $\Delta I_R(\lambda_i)$ is the difference in intensity of the reflected light at wavelength i as a result of the introduced vairation $\Delta I_i$.

8. The method according to claim 1, wherein said marginal reflectance is based on a derivative of the first level of reflected light from the plant with respect to said first base level radiant flux and a derivative of the second level of reflected light from the plant with respect to said second base level radiant flux at the first and second wavelengths ranges respectively.

9. The method according to claim 1, further comprising: estimating a matrix K according to an equation given by $$\hat{K} = \arg\min_K \sum_{i=1}^{N} \|\Delta I_R(t) - K \Delta P(t)\|^2,$$

where $\Delta I_R$ is the variation in reflected light and $\Delta P$ is the variation in applied power for emitting light, $\Delta I_R$ and $\Delta P$ given by:

$$\Delta I_R(t) = [\Delta I_{R1}(t) \ \Delta I_{R2}(t) \ \ldots \ \Delta I_{Rn}(t)]^T$$
$$= I_R(t) - \bar{I}_R$$
$$\Delta P(t) = [\Delta P_1(t) \ \Delta P_2(t) \ \ldots \ \Delta P_m(t)]^T$$
$$= P(t) - \bar{P}$$

and, adjusting the applied power P with feedback control according to the equation.

10. The method according to claim 1, wherein said marginal reflectance is a ratio between a variation in reflected light in a wavelength range and a variation in applied power to induce the variation in reflected light.

11. An illumination system for artificial illumination of a plant, the illumination system comprising:
a first and a second light source;
a sensor configured to receive light reflected from the plant, and
a control unit, the control unit being electrically coupled to the sensor and the first and the second light source, wherein the control unit is configured to:

control the first and the second light source to illuminate the plant with a first and a second predetermined base level radiant flux, respectively;
introduce a minor variation to at least one of the first and the second base level radiant flux;
determine, by the at least one sensor, a first level of reflected light within the first wavelength range and a second level of reflected light within the second wavelength range;
estimate a marginal reflectance based on the first and the second levels of reflected light from the plant within the first and second wavelengths ranges, wherein the marginal reflectance comprises a derivative of the first or the second levels of reflected light with respect to the first and the second predetermined base level radiant flux, respectively; and
adjust a radiant flux of light emitted by the first light source such that the marginal reflectance within the first wavelength range stands in a predetermined relation to the marginal reflectance within the second wavelength range.

* * * * *

UNITED STATES PATENT AND TRADEMARK OFFICE
CERTIFICATE OF CORRECTION

PATENT NO. : 10,188,046 B2
APPLICATION NO. : 14/430323
DATED : January 29, 2019
INVENTOR(S) : Torsten Wik et al.

Page 1 of 1

It is certified that error appears in the above-identified patent and that said Letters Patent is hereby corrected as shown below:

In the Specification

Column 1, Line 8, "PCT/2013/069820" should be --PCT/EP2013/069820--.

Signed and Sealed this
Seventeenth Day of September, 2019

Andrei Iancu
*Director of the United States Patent and Trademark Office*